United States Patent [19]

Arakawa et al.

[11] Patent Number: 4,814,938

[45] Date of Patent: Mar. 21, 1989

[54] HIGH VOLTAGE CAPACITOR

[75] Inventors: Hajime Arakawa; Osamu Yamaoka, both of Youkaichi; Shinichi Kobayashi, Oumihachiman; Kunio Okumura, Youkaichi; Kanichi Morishita, Shiga, all of Japan

[73] Assignee: Murata Manufacturing Co., Ltd., Kyoto, Japan

[21] Appl. No.: 84,939

[22] Filed: Aug. 13, 1987

[30] Foreign Application Priority Data

| Aug. 13, 1986 | [JP] | Japan | 61-124138[U] |
| Dec. 29, 1986 | [JP] | Japan | 61-200005[U] |
| Jan. 7, 1987 | [JP] | Japan | 62-1328 |
| Jan. 28, 1987 | [JP] | Japan | 62-12034[U] |
| Mar. 5, 1987 | [JP] | Japan | 62-51704 |
| May 30, 1987 | [JP] | Japan | 62-84301[U] |
| May 30, 1987 | [JP] | Japan | 62-84302[U] |

[51] Int. Cl.$^4$ .............................. H01G 3/28; H01G 4/42
[52] U.S. Cl. ............................... 361/302; 361/330
[58] Field of Search ............ 361/302, 330; 333/182

[56] References Cited

U.S. PATENT DOCUMENTS

| 3,617,832 | 11/1971 | Ito et al. | 361/302 |
| 3,683,244 | 8/1972 | Kitamura et al. | 361/302 |
| 3,808,478 | 4/1974 | Winkler | 361/302 |
| 4,370,698 | 1/1983 | Sasaki | 361/302 |

Primary Examiner—Donald A. Griffin
Attorney, Agent, or Firm—Wenderoth, Lind & Ponack

[57] ABSTRACT

A high voltage capacitor used for a low-pass filter circuit or the like in a magnetron oscillator circuit of an electronic cooking range includes in combination, a capacitor unit, a ground terminal into which the unit is inserted, two perforating conductors inserted through two through-bores extending in the capacitor unit, insulating casings encircling the capacitor unit on both sides of the ground terminal, insulating resin disposed in both of the insulating casings and surrounding the capacitor unit, an electrode at the outer periphery of the capacitor unit, and electrodes at the inner periphery of each through-bore which surround and are conductively coupled to each perforating conductor. When compared to a conventional high voltage capacitor, the present invention has a reduced number of components, is simple in construction, and is not subject to a lowering of the breakdown voltage durability caused by a heat cycle or the like.

8 Claims, 6 Drawing Sheets

HIGH VOLTAGE CAPACITOR

BACKGROUND OF THE INVENTION

1. Field of the Invention

The present invention relates to a high voltage capacitor used for a low-pass filter circuit or the like in a magnetron oscillator circuit of an electronic cooking range.

2. Description of the Related Art

Figure 22:
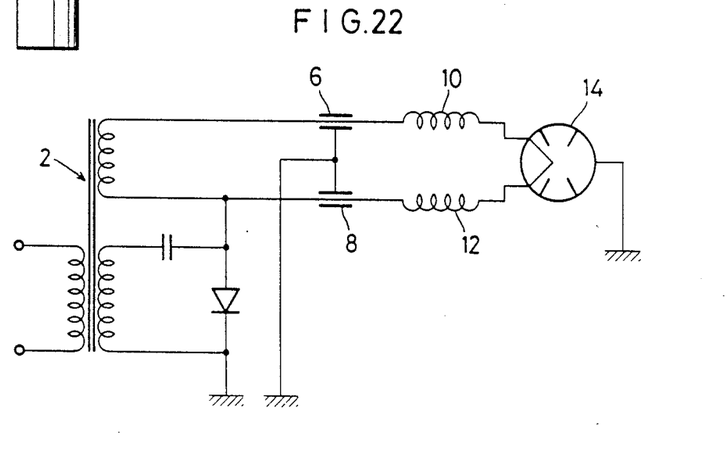
FIG. 22 is a circuit diagram exemplary of a magnetron oscillator circuit of an electronic cooking range.

FIG. 22 shows an example of the magnetron oscillator circuit of an electronic cooking range. This kind of circuit is provided with a constant (K) filter circuit comprising capacitors 6 and 8 and coils 10 and 12 to prevent the external conduction and radiation of high frequency noise generated from a magnetron 14. In this case, voltage applied to the capacitors 6 and 8 ordinarily includes heater voltage (e.g., 6,3 V rms) and anode voltage (e.g., Dc 3 to 6 KV) of the magnetron 14. From the property of the magnetron 14 and a step-up transformer (magnetic leakage transformer) 2, since an inrush pulse and a rising pulse of 10 to 20 $KV_o$-p is generated during the oscillation of magnetron 14, the capacitors 6 and 8 require a high breakdown voltage durability of 20 KV and the electronic cooking range requires an accurate cooking-heating cycle when used. Hence, a relatively complicated capacitor as shown in FIG. 23 has hitherto been used as the capacitors 6 and 8 in the circuit shown in FIG. 22.

Figure 23:
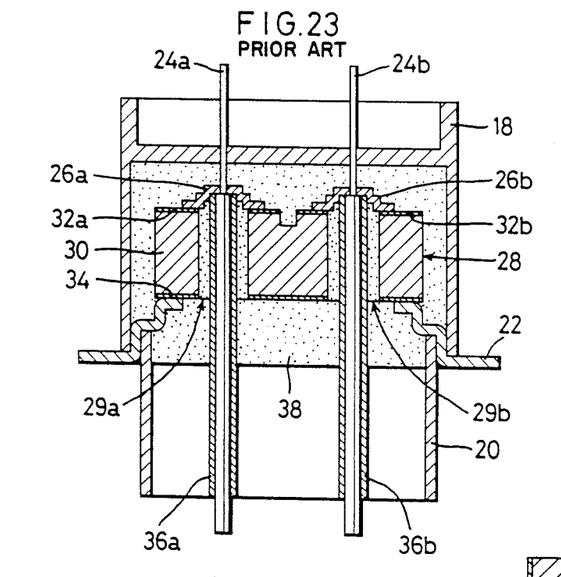
FIG. 23 is a longitudinal sectional view exemplary of a conventional high voltage capacitor.
Figure 24:
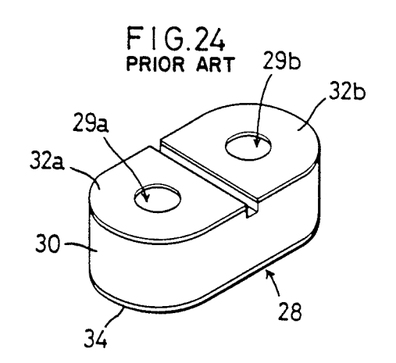
FIG. 24 is a perspective view of a capacitor unit used in the conventional high voltage capacitor of FIG. 23.
Figure 25:
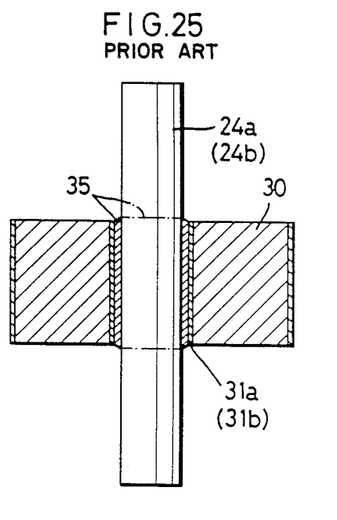
FIG. 25 is a longitudinal sectional view of the soldered construction comprising the conventional dielectric and perforating conductor.
Figure 26:
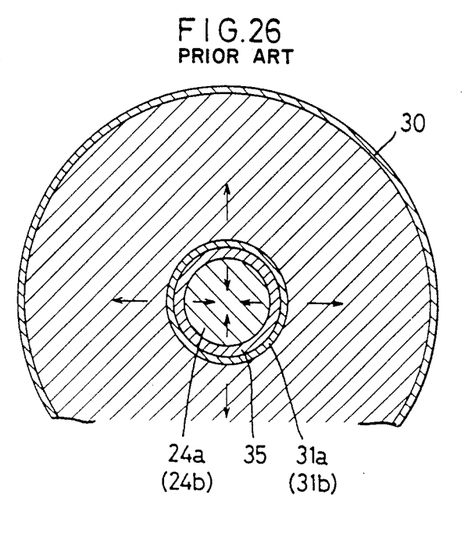
FIG. 26 is a cross-sectional view of the soldering construction of FIG. 25.

Specifically, the high voltage capacitor includes perforating conductors 24a and 24b extending through through-bores 29a and 29b defined in a substantially elliptical capacitor unit 28 (see FIG. 24). The outside of the unit 28 is covered by insulating cases 18 and 28 to be molded with insulating resin 38. Split electrodes 32a and 32b at one end face of the capacitor unit 28 are soldered to the perforating conductors 24a and 24b through cap terminals 26a and 26b, an all-out electrode 34 at the other end face being soldered to ground terminal 22. Hence, the capacitors are disposed between the perforating conductors 24a and 24b and the ground terminal 22.

However, the high voltage capacitor shown in FIG. 23 is subject to the following problems:

(I) In order to suppress stress in the insulating resin 38 at the through-bores 29a and 29b of the capacitor unit 28, the perforating conductors 24a and 24b in the insulating resin 38 are required to be covered with tubes 36a and 36b comprising flexible material (e.g., silicone rubber) attributing to a high manufacturing cost. The reason for this is that since the perforating conductors 24a and 24b are superior to a porcelain dielectric 30 with respect to adhering to insulating resin 38, if the tubes 36a and 36b are omitted, the residual stress or stress due to a temperature change in insulating resin 38 results in the insulating resin 38 peeling from the porcelain dielectric 30, thereby lowering the breakdown voltage durability.

(II) Since the coefficient of linear expansion of the porcelain dielectric 30 at the capacitor unit 28 is smaller by about one digit than that of the insulating casing 18 or the insulating resin 38, the porcelain dielectric 30 and insulating resin 38 are liable to cause a peel-off under the changing thermal conditions. As a result, the breakdown voltage durability lowers.

(III) The number of parts is larger and construction is complicated, whereby the capacitor is hard to manufacture and expensive to produce.

In order to avoid the above-mentioned problems, it is required to accurately set the dimension of a gap between the perforating conductors 24a and 24b and the inner electrodes 31a and 31b and to accurately maintain a soldering condition such as the heating temperature of solder, resulting in difficulties pertaining to dimension management or condition management.

SUMMARY OF THE INVENTION

A first object of the invention is to provide a high voltage capacitor having fewer parts, a simple construction, and that is easy to manufacture and inexpensive to produce.

A second object of the invention is to provide a high voltage capacitor that is free from having the breakdown voltage resistance thereof, caused by a heat cycle or the like, lowered.

These and other objects and features of the invention will become more apparent from the detailed description in conjunction with the accompanying drawings.

DETAILED DESCRIPTION OF THE PREFERRED EMBODIMENTS

A first embodiment of a high voltage capacitor of the present invention shown in FIGS. 1 through 5 includes a capacitor unit 58 comprising a substantially elliptical dielectric (for example, dielectric porcelain) 60 having two through-bores 59a and 59b, an external electrode 64 extending around the entire outer periphery of the dielectric 60, and internal electrodes 62a and 62b formed at the inner peripheries of the through-bores 59a and 59b respectively. In addition, the capacitor unit 58 in this embodiment has stepped portions 61a and 61b formed at parts of the through-bores 59a and 59b of the dielectric 60 and a stepped portion 61c at part of the outer periphery of the dielectric 60, thereby facilitating positioning of perforating conductors 54a and 54b and a ground terminal 52 to be discussed below.

Figure 1:
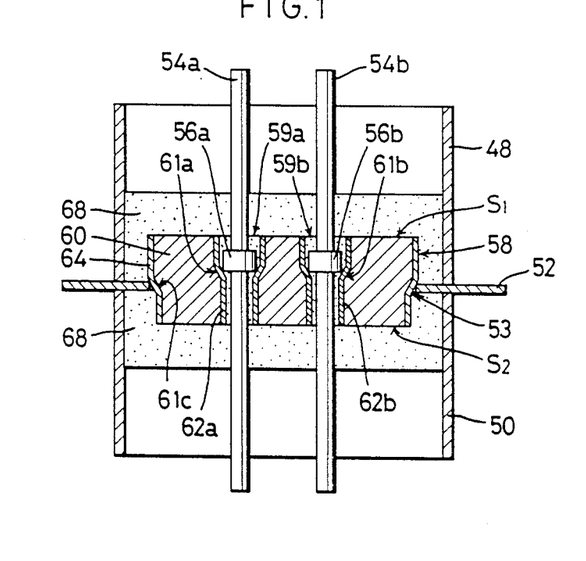
FIG. 1 is a longitudinal sectional view of a first embodiment of a high voltage capacitor of the invention.
Figure 2:
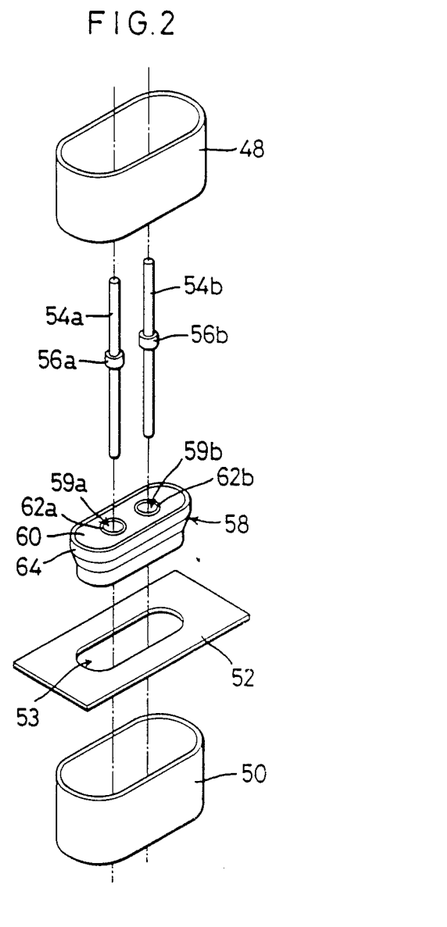
FIG. 2 is a perspective exploded view thereof.

Incidentally, the internal electrodes 62a and 62b and external electrode 64 are easily applied to the dielectric 60 in a manner, for example, in which (1) the entire outer periphery of the dielectric 60 is subjected to electroless plating (of Ni, Cu or the like) and thereafter end faces $S_1$ and $S_2$ to be the insulating portions are polished off, or (2) the end faces $S_1$ and $S_2$ to be the insulating portions are previously coated with a resist and, after the electroless plating, the resist is removed.

The capacitor unit 58 is inserted into a through-bore 53 having a size corresponding thereto and extending in the ground terminal 52, the external electrode 64 at the capacitor unit 58 and the ground terminal 52 being conductively joined along the entire outer periphery of the capacitor unit 58 with solder or a conductive adhesive.

Furthermore, two perforating conductors 54a and 54b having at intermediate portions thereof projections 56a and 56b are inserted into the through-bores 59a and 59b of the capacitor unit 58 until the projections 56a and 56b are disposed in the bores 59a and 59b respectively, and the internal electrodes 62a and 62b and projections 56a and 56b of the perforating conductors 54a and 54b are conductively joined with solder or a conductive bond.

Cylindrical insulating casings 48 and 50 each open at both axial ends cover the capacitor unit 58 on both the surfaces of ground terminal 52, encircling the capacitor unit 58 and perforating conductors 54a and 54b, and are fixed to the ground terminal 52 (with fixing means to be discussed below). Furthermore, insulating resin 68, such as epoxy resin, is placed in both of the insulating casings 48 and 50 thereby enclosing the capacitor unit 58.

Incidentally, when the insulating resin 68 is applied, it is placed in, for example, one insulating casing 48 and cured, and thereafter, the high voltage capacitor is turned vertically upside down and the resin 68 is placed in the other casing 50, thus enabling the resin 68 to be applied twice. Even in this case, since the conductive bond, such as solder, seals the external electrode 64 of the high voltage capacitor unit 58 and the ground terminal 52 and seals the internal electrode 62a and 62b and the perforating conductors 54a and 54b respectively, leaking of the insulating resin 68 to the exterior is prevented.

The aforesaid high voltage capacitor, which has two electrostatic capacities between the two internal electrodes 62a and 62b and the common external electrode 64, is an equivalent electric circuit to that of the conventional high voltage capacitor shown in FIG. 23.

In the first embodiment of the high voltage capacitor of the invention, even if insulating resin 68 is peeled off at the inner surface of each through-bore 59a and 59b, creeping discharge does not occur because of the surrounding electrode surface equal in potential, thereby preventing a lowering of the breakdown voltage resistance. Accordingly, there is no need to cover the perforating conductors 54a and 54b with conventional tubes. Hence, the capacitor is inexpensive to manufacture.

The insulating casings 48 and 50 do not have bottoms and a space is formed above the end face of the inner insulating resin 68, whereby the part of the insulating resin 68 in contact with the end faces $S_1$ and $S_2$ is hardly subjected to vertical stress tending to peel off the resin 68. Hence, the insulating resin 68 is hard to peel off at the portion in contact with the end faces $S_1$ and $S_2$ and, the breakdown voltage resistance at the portion of resin 68 is unlikely to be diminished. In addition, the part of the insulating resin 68 in contact with the external electrode 64 at the capacitor unit 58 may be subjected to a pulling force caused by a heat cycle due to the existence of the insulating cases 48 and 50 at the outer periphery, whereby the resin 68 may be peeled off. Even if the resin 68 is peeled off, the portion thereof is the electrode surface and equal in potential, thereby presenting no problem of lowering the breakdown voltage resistance.

Furthermore, the capacitor of the invention has fewer parts and a simple construction, thereby being easy to manufacture and inexpensive to produce.

Figure 3:
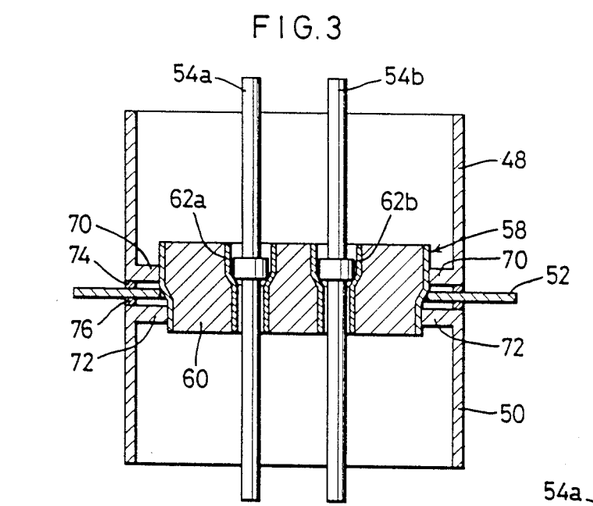
FIG. 3 is a longitudinal sectional view illustrating moutning means for mounting insulating casings to a ground terminal.
Figure 4:
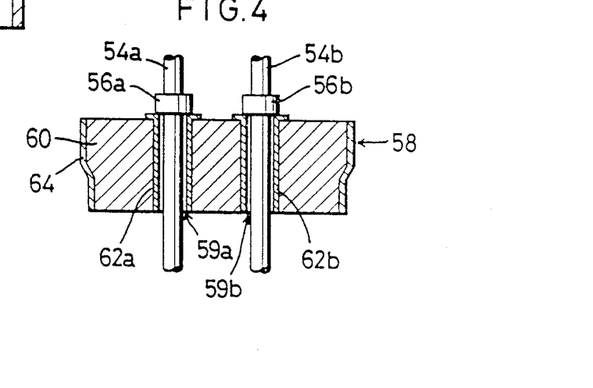
FIG. 4 is a sectional view of a modified embodiment of the high voltage capacitor of the invention, showing just a high voltage capacitor unit portion.

FIG. 3 is a sectional view exemplary of mounting means for mounting the insulating casings 48 and 50 to the ground terminal 52. This mounting means may, for example, comprise adhesive coated on the entire bottoms surfaces (to be bonded) of the insulating casings 48 and 50 in FIG. 1 that are to be bonded to the ground terminal 52. However, the mounting means shown in FIG. 3 may be used.

Specifically, the insulating casings 48 and 50 are provided at several portions of the inner surfaces thereof with projections 70 and 72, by which the capacitor unit 58 is nipped so that the insulating casings 48 and 50 can be temporarily fixed and simultaneously positioned, thereby facilitating assembly of the capacitor. In order to further ensure sealing of the insulating casings 48 and 50 and ground terminal 52, on both the bonded surfaces at the ground terminal 52 as shown in this embodiment, solid rings of adhesive 74 and 76, such as powder resin or polyester, may be predisposed and the insulating casings 48 and 50 covering the capacitor unit are heated to a temperature above the melting point of the solid adhesives 74 and 76. Thus, the adhesives 74 and 76 are melted to bond and reliably seal the insulating casings 48 and 50 and the ground terminal 52.

In addition, the stepped portions 61a through 61c provided at the capacitor unit 58 in FIG. 1 may be replaced with other positioning means of the capacitor unit 58 for positioning the perforating conductors 54a and 54b with respect to the ground terminal 52. For example, in the embodiment in FIG. 4, instead of providing the stepped portions of the through-bores 59a and 59b extending in the dielectric 60, the through-bores 59a and 59b are made smaller in diameter than the projections 56a and 56b of the perforating conductors 54a and 54b, the internal electrodes 62a and 62b extend to the upper surface of dielectric 60, and the projections 56a and 56b are temporarily held thereon before being conductively bonded.

Figure 5:
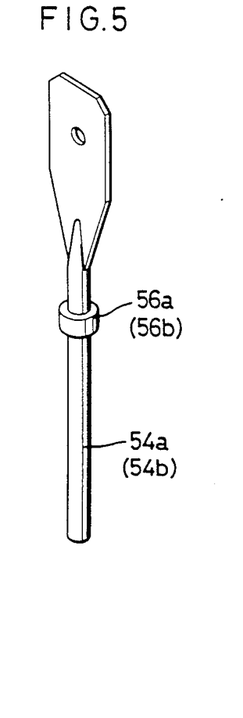
FIG. 5 is a perspective view of another example of a perforating conductor.

The perforating conductors 54a and 54b may be rod-shaped as mentioned above, but alternatively may be, for example, a known fastener-terminal type shown in FIG. 5.

FIGS. 6(a) through (f) illustrate a manufacturing process of forming the fastener-type perforating conductors 54a and 54b from one metal sheet.

Figure 6:
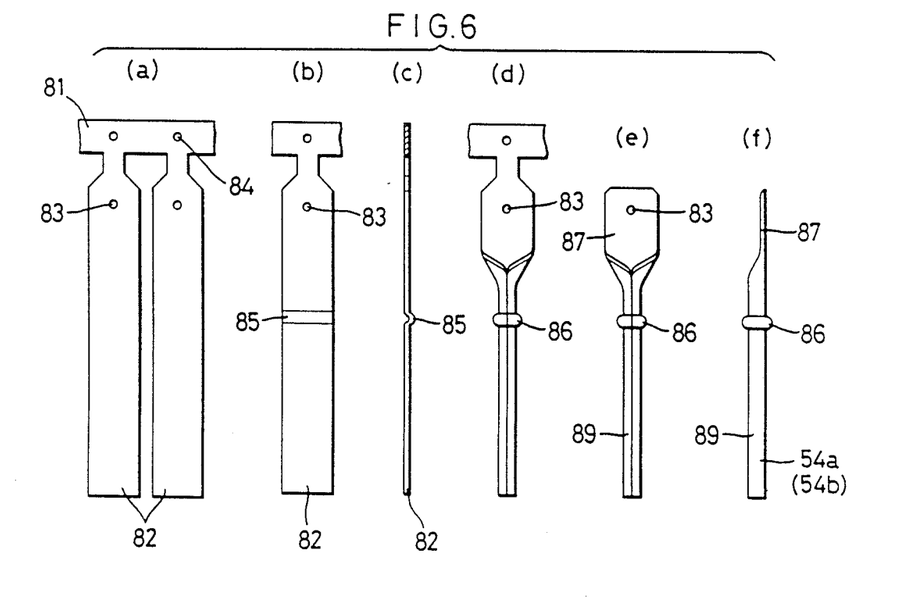
FIGS. 6(a) through (f) illustrate the manufacturing process of still another example of the perforating conductor.

In FIG. 6(a), the metal sheet is punched by a press to form strips 82 juxtaposed at predetermined intervals at one side of a continuous band 81, the strips 82 having a reduced width at the roots thereof.

In the vicinity of the thin portion of each strip 82 is provided a bore 83 formed by the press, and feeding bores 84 are formed by the press on the strips 81 at predetermined intervals.

Each strip 82 is pressed at an intermediate portion to form a bent portion 85 projecting at one side and recessed at the other side as shown in the front view of FIG. 6(b) and the side view of FIG. 6(c).

Thereafter, the strip 82 is curled at a portion disposed somewhat lower than the bore 83 by the press machinery thereby disposing the projection 85 on the outside as shown in FIG. 6(d).

Next, a portion disposed above the bore 83 is cut as shown in the front view of FIG. 6(e) and the side view of FIG. 6(f) and the upper edge is tapered to complete the conductor.

The completed conductor has a flange 86 formed of the bent portion 85, a flat plate-like upper end fasten tab 87, and a lower pipe-like terminal 89, which are substantially equivalent to those of the conventional conductor shown in FIG. 5.

FIGS. 7 through 13 show modified embodiments of the high voltage capacitor in which the surfaces of insulating casings 48 and 50 are coated with an insulating material 80 exhibiting superior water repellency or tracking resistance to thereby improve the tracking resistance at the insulating casing portions without sacrificing the heat cycle performance or the like. In the same drawings, the components similar to those shown in FIGS. 1 through 5 are designated by like reference numerals and the differences therebetween will mainly be described.

Figure 7:
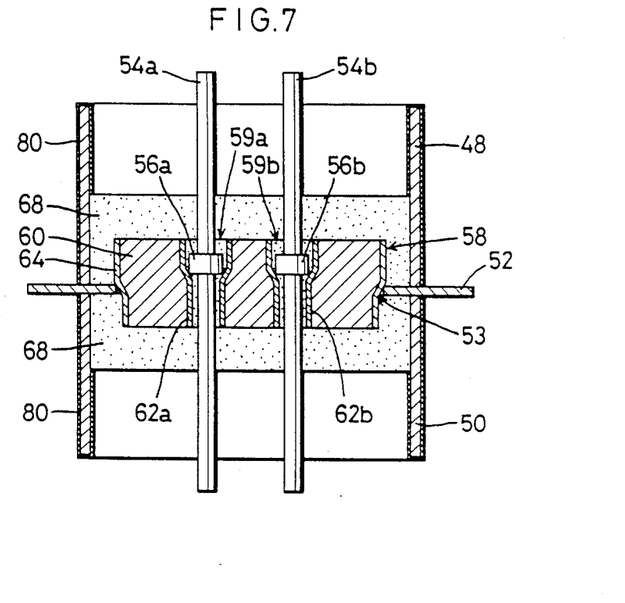
FIG. 7 is a longitudinal sectional view of another modified embodiment of the high voltage capacitor of the invention.

The high voltage capacitor in the embodiment shown in FIG. 7 uses the above-described polybutylene terephthalate resin for the insulating casings 48 and 50 and has the surfaces thereof coated with the insulating material 80.

The insulating material 80 comprises a material that does not absorb moisture easily, such as silicone varnish, silicone grease, silicone compound, silicone modified epoxy resin, epoxy modified silicone resin and fluorocarbon resin, or a material exhibiting superior tracking resistance, for example, epoxy resin using an acid anhydride series curing agent and thermosetting resin such as unsaturated polyester resin. In this case, it is preferable to use a flame retardant material.

In order to apply the insulating material onto the surfaces of insulating casings 48 and 50, the following methods can be adopted: (1) the insulating material 80 is previously coated on the insulating casings 48 and 50 by spraying, brush-painting or dipping and thereafter the high voltage capacitor is assembled, and (2) after the high voltage capacitor is assembled, the insulating material 80 is painted using brushes or by spraying the surface of the insulating casings 48 and 50.

Figure 8:
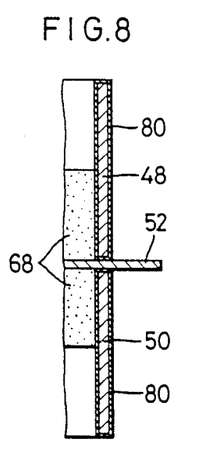
FIGS. 8 through 13 are partial longitudinal sectional views of various examples of the present invention showing insulating material applied to the high voltage capacitor.

In this case, the surfaces of the insulating casings 48 and 50 are coated with the insulating material 80 on at least the portions thereof exposed from the insulating resin 68 (shown in FIG. 7). Or, the insulating material 80, as shown in FIG. 8, may of course be applied to coat the entire surfaces of the insulating casings 48 and 50 (especially for the methods (1)). Furthermore, the coating of insulating material 80 may not only extend over the areas shown in FIGS. 7 and 8 but may also extend over the areas shown in FIGS. 9 through 13.

Figure 9:
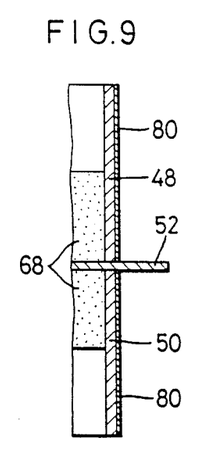
Figure 10:
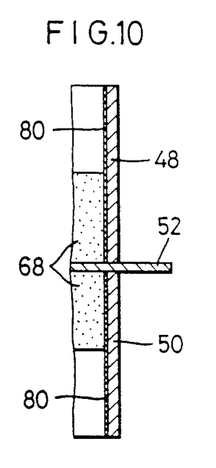
Figure 11:
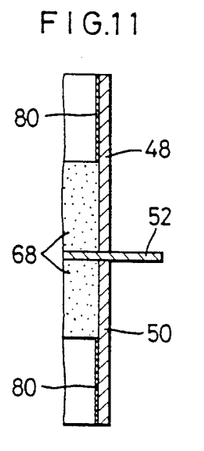
Figure 12:
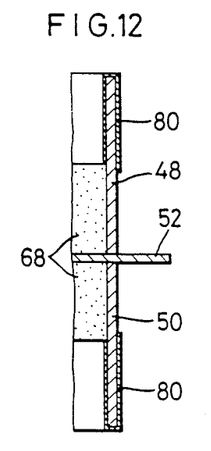
Figure 13:
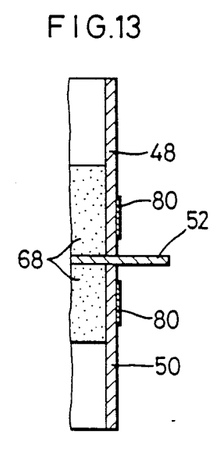

In brief, FIG. 9 shows the coating of insulating material 80 extending only on the outside surfaces of the insulating casings 48 and 50, FIG. 10 shows the same extending on the entire inside surfaces of insulating casings 48 and 50, FIG. 11 shows the same extending only on the inside exposed surfaces of the insulating casings 48 and 50, FIG. 12 shows the same extending contiguously on the outside exposed surfaces and part of the outer surface, and FIG. 13 shows the same extending on part of the outer surfaces of the insulating casings 48 and 50. All the above-mentioned embodiments include a coating of the insulating material on both the insulating casings 48 and 50, but when a problem is not particularly created as to the tracking resistance, only one of the insulating casings may be coated. In addition, the coating of insulating material 80 is, for example, about 30 to 500 um in thickness.

In the above-described embodiments of the high voltage capacitor, the insulating casings 48 and 50 comprise hygroscopic material that absorbs moisture easily in a high temperature and high moisture atmosphere and breakable once discharged, whereby the surfaces of insulating casings 48 and 50 are coated with the insulating material 80 exhibiting superior water repellency or tracking resistance, thereby improving the tracking resistance performance of parts of the insulating casings 48 and 50, and in turn the whole capacitor.

Moreover, since the insulating casings 48 and 50 can comprise polybutylene terephthalate resin as mentioned above, the high voltage capacitor is inexpensive to produce and does not sacrifice its heat cycle performance.

In addition, the material for the insulating casings 48 and 50 is not limited to polybutylene terephthalate resin but may be nylon, polypropylene or polyethylene terephthalate resin.

Figure 14:
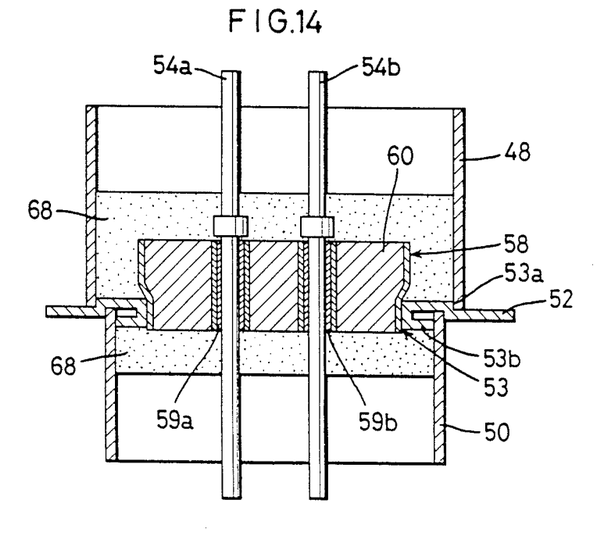
FIG. 14 is a longitudinal sectional view of still another embodiment of the high voltage capacitor of the invention.

Next, FIG. 14 shows a modified embodiment of the high voltage capacitor in which the contraction stress-strain of the insulating casing 48 and 50 and insulating resin 68 therein acts on the dielectric 60 at the capacitor unit 58 so that the dielectric 60 is prevented from cracking, thereby improving the heat cycle resistance.

In the same drawing, the components that are similar to those in FIGS. 1 through 5 are designated by like reference numerals and the difference therebetween will mainly be described.

A ground terminal 52 is formed of a metal sheet of copper or the like, a through-bore 53, into which the lower half of dielectric 60 is inserted, is formed at a central portion of the surface of ground terminal 52, and a stepped portion 53a is provided around the through-bore 53 of the ground terminal 52. Along the entire periphery of the through-bore 53 is formed a retainer 53b folded back toward the stepped portion 53a. In addition, in this embodiment, the retainer 53b is formed integrally with the entire peripheral edge defining the through-bore 53 but is not limited to such a configuration and, alternatively, may be divided circumferentially, with respect to the through-bore 53, at predetermined intervals. Thus, such an embodiment is effective in that the insulating resin 68 is filled reliably inside the retainers 53b. Or, a separate retaining member formed of lead wire may be soldered in the vicinity of the edge defining the through-bore 53a to thereby form the retainer 53b. Thus, the retainer 53b can be formed more easily than when formed integral with the ground terminal 52. In brief, the retainer 53b need only be configured to prevent the insulating casing 50 from moving toward the capacitor unit 58, whereby any suitable construction facilitating such a function may be employed.

The upper half of the capacitor unit 58 supported by the ground terminal 52 is covered by the cylindrical casing 48 of resin, the casing 48 being disposed outside the stepped portion of the ground terminals. Therefore, contraction in the casing 48 caused by a temperature change is imparted to the stepped portion 53a.

On the other hand, the lower half of the capacitor unit 58 is covered by the cylindrical casing 50 which is disposed between the stepped portion 53a and the retainer 53b of the ground terminal 52. Therefore, expansion in the casing 50 caused by a temperature change is imparted to the stepped portion 53a and contraction in the same is imparted to the retainer 53b.

The inventor of the present invention carried out the anti-heat cycle test under an abrupt temperature change of −40° C. to +120° C. with respect to the aforesaid high voltage capacitor, and the following result was obtained. Namely, the dielectric of the conventional high voltage capacitor is cracked when subjected to a temperature change of about 90 cycles, but no crack is produced in the dielectric of the present invention even when subjected to a temperature change of 300 cycles.

Accordingly, in the high voltage capacitor of the present invention, it is considered that the retainer 53b formed on the ground terminal 52 reliably suppresses contraction in the insulating casing 50 and insulating resin 68 therein, and the stepped portion 53a at the same time reliably suppresses contraction in the casing 48 and insulating resin therein, thereby reducing the contraction stress-strain acting on the dielectric 60.

Figure 15:
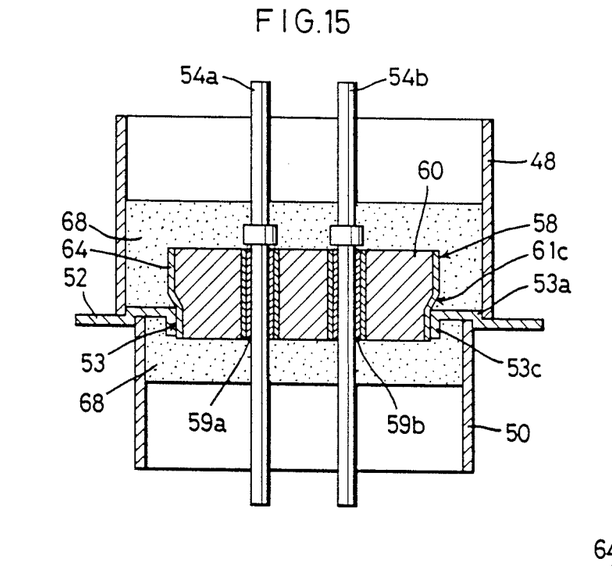
FIG. 15 is a longitudinal sectional view of a further modified embodiment of the high voltage capacitor of the invention.

Next, FIG. 15 shows another modified embodiment of the high voltage capacitor of the invention, in which contraction stress in the insulating casing 48 and 50 and insulating resin 68 therein acts on the dielectric of the capacitor normally tending to cause a crack, but in this embodiment being prevented.

In addition, the components similar to those in FIGS. 1 through 5 are designated by like reference numerals and description thereof is omitted.

As shown in FIG. 15, a ground terminal 52 holds the capacitor unit 58. At the central portion of the surface of ground terminal 52 is a through-bore 53 into which the lower half of the capacitor unit 58 is inserted, and around the through-bore 53 is a round stepped portion 53a.

Along the entire circumferential edge defining the through-bore 53 a retainer 53c extends downwardly and adjacent the outer periphery of the lower half of the capacitor unit 58. In addition, the retainer 53c in this embodiment is integral with the edge defining through-bore 53, but is not limited to such a construction and, alternatively, may be divided into radially opposite portions having a predetermined length, or separate retainers 53c may be disposed at circumferentially predetermined positions.

The upper half of the capacitor unit 58 held by the ground terminal 52 is covered by the cylindrical casing 48 comprising resin, the casing 48 being disposed outside the stepped portion 53a of the ground terminal 52.

Therefore, contraction of the casing 48 caused by a temperature change is imparted to the stepped portion 53a so that no crack is created in the capacitor unit 58.

Meanwhile, the lower half of the capacitor unit 58 is covered by a cylindrical insulating casing 50 comprising resin and disposed inside the stepped portion 53a of the ground terminal 52 and the lower half of the same is sealed with insulating resin 68 disposed in the insulating casing 50.

Therefore, a force due to expansion in the insulating casing 50 and insulating resin 68 therein occurring when the temperature rises is imparted to the stepped portion 53a and due to contraction occurring when the temperature lowers is imparted to the retainer 53c.

The anti-heat-cycle property test carried out with the capacitor in FIG. 14 has been carried out with respect to the above-mentioned high voltage capacitor, and the same result as mentioned above has been obtained.

Accordingly, in the high voltage capacitor in this embodiment, the retainer 53c formed at the ground terminal 52 reliably bears the force associated with contraction in the insulating casing 50 and insulating resin 68 therein and the stepped portion 53a formed at the ground terminal 52 reliably bears a force due to contraction in the casing 48 and insulating resin 68 therein, whereby it is considered that the contraction stress acting on the dielectric 60 at the capacitor unit 58 is reduced.

In addition, the downward span of the retainer 53c need only be an extent at which the contract stress applied to the dielectric 60 at the capacitor unit 58 creates no crack in the dielectric.

Next, FIGS. 16 through 19 show a preferable soldered construction comprising the internal electrode and the dielectric with the perforating conductor.

Figure 16:
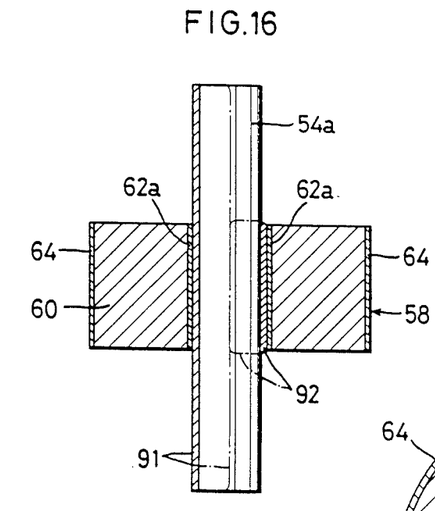
FIG. 16 is a longitudinal sectional view illustrating the coupling of a dielectric and a perforating conductor.

However, for simplification in the drawings, one through-bore of the dielectric is shown. Of course, the soldering construction may be applicable to a capacitor unit having two through-bores.

The dielectric 60 of the capacitor unit is cylindrical and comprises ceramic material, such as barium titanate, and is provided at the inner periphery with an internal electrode 62a and at the outer periphery with an external electrode 64 formed by baking silver paste thereon. The perforating conductor 54a comprises, for example, an iron core on which copper under-plating and tin upper-plating are applied, and is inserted into a bore defined within the internal electrode 62a.

Figure 18:
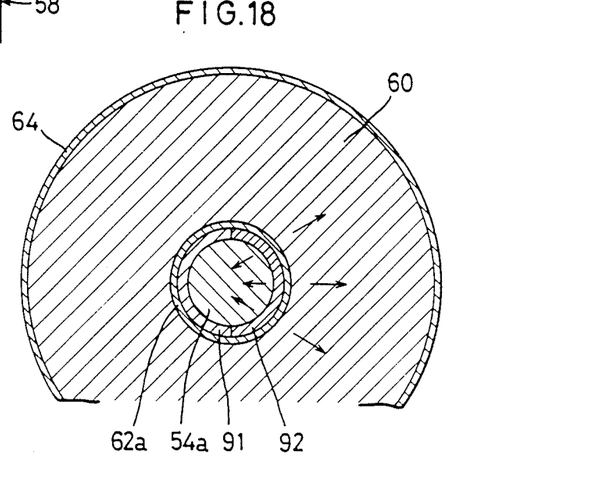
FIG. 18 is a cross-sectional view of the same.

One circumferential half of the outer periphery of the perforating conductor 54a is coated with a resist film 91 extending about the entire length of conductor 54a. The resist film is formed of epoxy, polyimide, fluorine, or melamine resin. Solder 92 is interposed between the internal electrode 62a and the other circumferential half of the outer periphery of the perforating conductor 54a, the solder 92 bonding the perforating conductor 54a and internal electrode 62a. Hence, the opposing portions of the internal electrode 62a and perforating conductor 54a are bonded at one circumferential half by the solder 92 and are not bonded at the other half. In this example, the resist film extends continuously and axially along the dielectric 60, the non-bonded portion by the resist film 91 extending axially through the dielectric 60.

Figure 17:
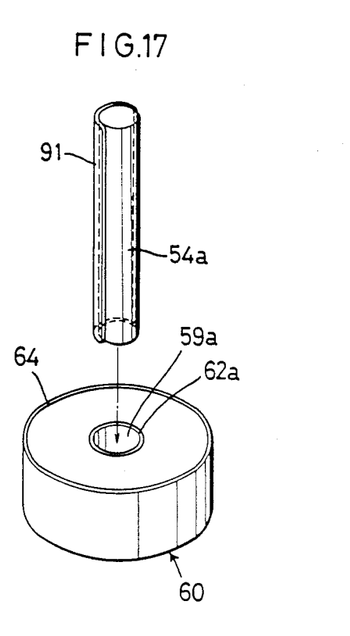
FIG. 17 is a perspective exploded view of the same.

During assembly, as shown in FIG. 17, the perforating conductor 54a coated at the peripheral half portion by the resist film 91 is prepared, the perforating conductor 54a is inserted into the through-bore 59a of the dielectric 60, and under this condition molten solder flows within the internal electrode 62a. The molten solder is spread along the peripheral half portion having no resist film 91 thereon at the portion of the internal electrode 62a opposing perforating conductor 54a, thereby forming a semicircular bonded portion formed by soldering.

In the above-described construction, when the molten solder sets between the internal electrode 62a and the perforating conductor 54a, as shown in FIG. 8, the perforating conductor 54a is attracted toward the bonded portion of solder 92 to enlarge the gap at the non-bonded portion, thereby scarcely generating stress between the perforating conductor 54a and the dielectric 60. Hence, peel off of the internal electrode 62a is prevented.

When the capacitor as a whole repeatedly expands and contracts under a thermal cycle, the perforating conductor 54a and dielectric 60, when the capacitor as a whole is cooled, contacts the bonded portion of solder 92, whereby the perforating conductor 54a is attracted to soldered portion 92 only and stress is scarcely generated between the perforating conductor 54a and the dielectric 60. Hence, peel-off of the internal electrode 62a is prevented.

A comparison test was performed on the high voltage capacitor of the present invention subjected to the aforesaid soldering and a conventional one with the results being shown in the appended table.

The test specimen was a perforating capacitor unit comprising a barium titanate ceramic dielectric 12 um in outer diameter, 3 um in inner diameter and 5 um thick and a perforating conductor 2.8 um in diameter and 15 um long. The specimen according to the present invention was provided at a half of the outer periphery of the perforating conductor with a resist film of about 60 to 70 um thick The perforating conductor and internal electrode were bonded with solder. A rate of change in electrostatic capacity after soldering and that when a predetermined number of heat shocks was applied to the specimen after bonding, have been examined on a basis of a value of electrostatic capacity prior to soldering.

TABLE

| | After Bonding | After Heat Shock | | |
|---|---|---|---|---|
| | | 10 Times | 30 Times | 50 Times |
| Conventional | −2.3% | −7.5% | −12.6% | −18.0% |
| Present Invention | −0.5% | −1.9% | −2.8% | −4.2% |

In addition, the heat shock applied a temperature change of −30° C. to 100° C., the respective specimens being 20.

From the test results listed above, it is seen that the high voltage capacitor of the present invention exhibited a smaller rate of change of electrostatic capacity than did the conventional one.

Incidentally, the aforesaid embodiment included the peripheral half solder-bonded portion 92 and the peripheral half non-bonded portion, but the ratio of the portions is not limitative. Hence, the solder-bonded portion and non-bonded portion can be provided in any proper ratio. Also, after the solder-bonded portion is formed, the resist film may be removed. In this case, the non-bonded portion is left adjacent a gap.

Figure 19:
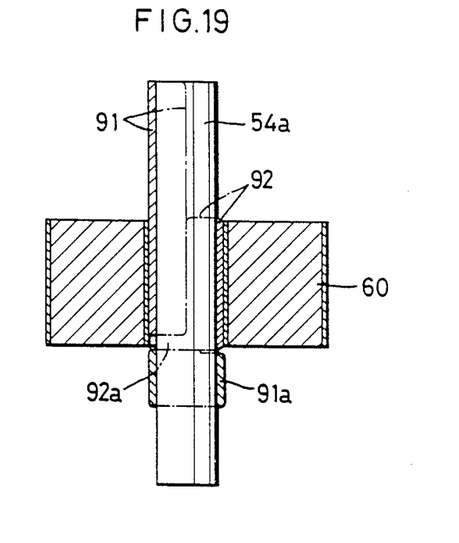
FIG. 19 is a longitudinal sectional view of a modification of the same.

Furthermore, in the above-described embodiment, the non-bonded portion extends in the dielectric 60 axially, but the same does not necessarily pass through the dielectric 60. As shown in FIG. 19, solder 92 may encircle the entire inner periphery of the dielectric 60 at a part thereof to form a linear solder-bonding portion 92a. In this case, the resist film 91 is removed from part of the periphery of the dielectric 60 and a circular portion 91a of the resist film encircling the periphery of the conductor 54a remains and is axially spaced from the area at which the resist film has been removed.

Usually, in the capacitor unit comprising the dielectric 60 as mentioned above, resin for coating is injected therein separately from the front surface side of the rear surface side of the dielectric 60. In this case, when the non-bonded portion is passed through the dielectric 60, the resin could flow from the front surface or rear surface side toward the opposite surface side of the dielectric 60 through the non-bonded portion, but when the non-bonded portion, as shown in FIG. 19, is cut off by the linear solder bonded portion 92a spaced axially from the dielectric 60, the resin, when injected, is prevented from flowing to the opposite surface.

Figure 20:
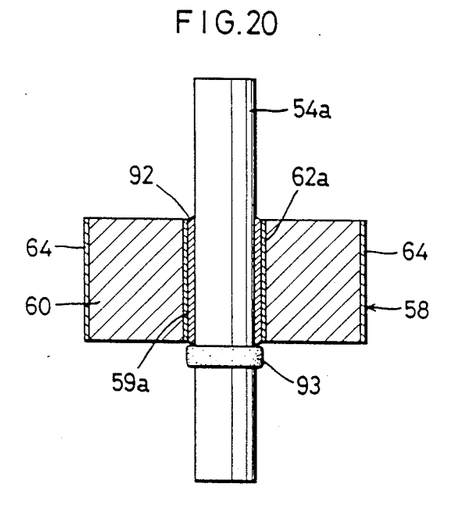
FIG. 20 is a longitudinal sectional view of a modification of the same, having means for preventing solder flow.
Figure 21:
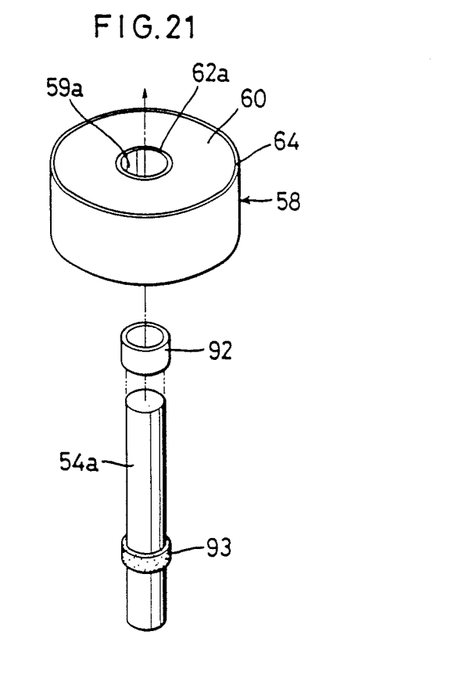
FIG. 21 is a perspective exploded view of the modified device of FIG. 20.

In order to interrupt the flow of solder in the through-bore at the dielectric 60, an annular blocking member 93 may be provided at the outer periphery of conductor 54a to impede the flow of solder, as shown in FIGS. 20 and 21.

In FIGS. 20 and 21, in order to simplify the drawings, one through-bore is shown for convenience, but the invention of course is applicable to a capacitor unit having two bores.

The flow blocking member 93 for blocking the flow of solder is formed from a solder resist agent comprising epoxy resin, polyimide resin, fluorine resin, melamine resin or the like, and is positioned in the vicinity of one open end of the through-bore 59a.

In this embodiment, the flow blocking member 93 is positioned outside the open end of the through-bore 59a, but may alternatively be positioned within the through-bore 59a.

The flow blocking member 93 preferably encircles the entire outer periphery of the perforating conductor 54a, but may alternatively be discontinuous at part of the outer periphery of the same.

The high voltage capacitor of the invention is assembled in a manner in which the perforating conductor 54a having the flow blocking member 93 is prepared and inserted into the through-bore 59a of the dielectric, the flow blocking member 93 is positioned in the vicinity of an open end of through-bore 59a, that is, below the bore 59a in this embodiment, solder 92, such as ring solder or solder paste, is fed into the upper open end, and thereafter the solder 92 is heated until it is molten.

The molten solder permeates into a gap between the perforating conductor 54a and the internal electrode 62a, at which time when the gap is larger than a predetermined width, or the internal electrode 62a is solder saturated, the molten solder flows down along the outer periphery of the perforating conductor 54a tending to flow from the through-bore 59a but is blocked by the flow blocking member 93 disposed below the through-bore 59a, thereby not flowing further downwardly.

Hence, the molten solder stops in the through bore 59a and sets thereby filling the gap.

Although several embodiments have been described, they are mrerely exemplary of the invention and not to be construed as being limitative, the invention being defined solely by the appended claims.

We claim:

1. A high voltage capacitor comprising:
   a capacitor unit including a dielectric, said dielectric having a pair of opposite end surfaces, a peripheral side surface extending between said end surfaces, and two through-bores extending therethrough between and open to said opposite end surfaces,
   a respective inner electrode disposed in each of said through-bores and extending over a respective inner peripheral surface of said dielectric that defines each of said through-bores, and
   an outer electrode extending over the outer peripheral surface of said dielectric;
   a ground terminal having a through-bore extending therethrough and in which said capacitor unit is disposed, an inner peripheral edge of said ground terminal extending over and conductively coupled to said outer electrode;
   a perforating conductor extending in each of said through-bores and electrically conductively coupled to the inner electrode disposed therein;
   tubular insulating casings encircling said capacitor unit on opposite sides of said ground terminal, respectively; and
   insulating resin disposed within each of said tubular casings, said insulating resin covering said capacitor unit.

2. A high voltage capacitor as claimed in claim 1, and further comprising a coating of insulating material exhibiting superior water repellency or tracking resistance disposed on at least one surface of at least one of said tubular casings.

3. A high voltage capacitor as claimed in claim 1, wherein said ground terminal has a stepped portion extending around the through-bore thereof, and a retainer portion extending from the inner peripheral edge thereof toward said stepped portion, and
   one of said tubular casings extends from one side of said ground terminal at a location disposed outwardly adjacent said stepped portion, and the other of said tubular casings extends from the other side of said ground terminal at a location disposed between said stepped portion and said retainer portion.

4. A high voltage capacitor as claimed in claim 1, wherein said ground terminal has a stepped portion extending around the through-bore thereof, and a retainer portion extending from said inner peripheral edge thereof over a lower half of said capacitor unit,
   one of said tubular casings extends from one side of said ground terminal at a location disposed outwardly adjacent said stepped portion, and
   the other of said tubular casings extends from the other side of said ground terminal at a location disposed inwardly adjacent said stepped portion.

5. A high voltage capacitor as claimed in claim 1, wherein a soldered portion at which each of said perforation conductor is bonded to each said inner electrode, respectively, extends between and over a circumferential portion of confronting surfaces of the perforating conductor and the inner electrode, the remaining circumferential portion of the confronting surfaces being a noncoupled portion at which each said perforating conductor is not bonded to each said inner electrode.

6. A high voltage capacitor as claimed in claim 1, wherein a soldered portion at which each of said perforating conductors is bonded to each said inner electrode comprises solder and is disposed in said through-bores of said dielectric, respectively, and
   each of said perforating conductors includes a flow-blocking member disposed adjacent one of the end faces of said dielectric at a location at which a respective one of the through-bores of said dielectric is open to said one of said end faces for blocking the flow of said solder from said through-bores of said dielectric toward said one of said end faces when the solder is in a molten state.

7. A high voltage capacitor as claimed in claim 1, wherein each of said perforating conductors is a fastener-type conductor consisting of a metal plate, one end portion of each of said perforating conductors having a pipe-like shape including a projecting flange portion extending therearound, the other end portion of each of said perforating conductors being substantially flat.

8. A high voltage capacitor unit as claimed in claim 1, wherein said capacitor unit has a stepped portion seated on the inner peripheral edge of said ground terminal defining the through-bore of said ground terminal.

* * * * *